US008826580B2

(12) United States Patent
Lewis (10) Patent No.: US 8,826,580 B2
(45) Date of Patent: Sep. 9, 2014

(54) RIFLE SUPPORT (76) Inventor: Gavin William Lewis, Longford (AU)

( * ) Notice: Subject to any disclaimer, the term of this patent is extended or adjusted under 35 U.S.C. 154(b) by 0 days.

(21) Appl. No.: 13/510,785

(22) PCT Filed: Oct. 25, 2010

(86) PCT No.: PCT/AU2010/001417
§ 371 (c)(1),
(2), (4) Date: Jul. 30, 2012

(87) PCT Pub. No.: WO2011/060481
PCT Pub. Date: May 26, 2011

(65) Prior Publication Data
US 2012/0285068 A1    Nov. 15, 2012

(30) Foreign Application Priority Data
Nov. 18, 2009  (AU) ................. 2009905644

(51) Int. Cl.
F41C 27/00 (2006.01)
(52) U.S. Cl.
USPC ............................. 42/94; 42/71.01
(58) Field of Classification Search
USPC .................................. 42/94, 71.01
See application file for complete search history.

(56) References Cited

U.S. PATENT DOCUMENTS 2,898,137 A * 8/1959 Kreske ............................ 403/299
3,662,649 A * 5/1972 Williams ...................... 89/40.11

(Continued)

FOREIGN PATENT DOCUMENTS

GB       414928     8/1934
GB       2 346 202  8/2000

OTHER PUBLICATIONS

International Preliminary Report on Patentability dated Sep. 21, 2011 in corresponding PCT/AU2010/001417.

Primary Examiner — Michelle Clement
(74) Attorney, Agent, or Firm — Hovey Williams LLP (57) ABSTRACT The present invention relates to a telescoping leg for a firearm such as a rifle. The leg includes a pair of telescopically slidable elongated members. The first member is configured to be fixed to the stock of a rifle. The second member is telescopically slidable relative to the first member between a retracted position and an extended position. The leg also includes a biasing means to bias the second member towards the extended position and a damper means for damping the movement of the second member between the retracted and extended positions. In one form, one of the first member and the second member is a casing having an inner surface defining in part a gas chamber, the other one of the first member and the second member is a piston received at least partially in the casing for reciprocation along an axis between the retracted and extended positions. The biasing means includes a compressible gas contained in the chamber that yieldably biases the piston towards the extended position. The present invention is advantageous in that when fixed to the butt of the stock of a rifle the leg provides a means of supporting at least part of the weight of the rifle, in particular the weight of the butt and the stock of the rifle, on a surface. The invention is particularly suitable for use with a rifle to which a bipod is mounted towards the front of the stock of the rifle. The invention enables a user to provide stable and controlled changes to the elevation of the rifle on a target and to maintain the elevation of the rifle for an extended period of time while reducing the burden on the user to support the weight of the rifle.

19 Claims, 6 Drawing Sheets

(56) References Cited

U.S. PATENT DOCUMENTS

| | | | |
|---|---|---|---|
| 4,815,574 A | 3/1989 | Taylor et al. | |
| 5,345,706 A * | 9/1994 | Brown | 42/94 |
| 5,438,786 A * | 8/1995 | Hilderbrand | 42/94 |
| 5,620,066 A * | 4/1997 | Schuttler | 188/300 |
| 6,047,797 A | 4/2000 | Popjoy | |
| 6,305,116 B1 * | 10/2001 | Parker | 42/94 |
| 7,124,528 B2 * | 10/2006 | Long | 42/71.02 |
| 7,610,711 B2 * | 11/2009 | Oz | 42/94 |
| 7,845,602 B1 * | 12/2010 | Young et al. | 248/125.8 |
| 7,861,452 B2 * | 1/2011 | Moody et al. | 42/94 |
| 8,156,676 B1 * | 4/2012 | Moody | 42/71.01 |
| 8,443,538 B1 * | 5/2013 | Moody | 42/71.01 |
| 2009/0056192 A1 * | 3/2009 | Oz | 42/94 |
| 2010/0307043 A1 * | 12/2010 | Moody et al. | 42/72 |
| 2011/0126444 A1 * | 6/2011 | Keng et al. | 42/94 |
| 2011/0173867 A1 * | 7/2011 | Young | 42/94 |

* cited by examiner

RIFLE SUPPORT

RELATED APPLICATIONS

The present application is a national stage application under 35 U.S.C. 371 of International Application No. PCT/AU2010/001417, filed 25 Oct. 2010, which claims the priority of Australian Patent Application N. 2009905644, filed 18 Nov. 2009, both of which are incorporated by reference herein in their entireties.

FIELD OF THE INVENTION

The present invention relates to supports or legs for firearms. The present invention particularly relates to a telescoping leg for a rifle though the present invention is not necessarily limited to telescoping legs for a rifle but may have broader application.

BACKGROUND OF THE INVENTION

Firearms, such as rifles, can be fitted with various accessories to enhance the use of the rifle. One such accessory is a bipod which is typically fitted to a stock of a rifle forward of the trigger mechanism but rearward of the tip of the barrel of the rifle. Bipods typically include a pair of legs that are collapsible and extendable. When the legs are extended they may rest on the ground or some other supporting surface in order to stabilise the forward end of the rifle. Bi-pods typically include a fitting that attaches to the rifle. The legs typically extend from the fitting and, thus, from the rifle. The fitting that attaches to the rifle acts as a pivot point for the movement of the barrel of the rifle either vertically, horizontally or radially to acquire a target aiming point.

When the user is in a prone position the user must support part of the weight of the rifle by resting a butt of the stock on the user's arm and shoulder. The user may hold their cheek against the stock. Alternatively, the user may physically place a support under the butt or otherwise make adjustments that will stabilise the butt at a desired height above the supporting surface before supporting part of the weight of the rifle with the user's arm and shoulder and holding their cheek against the stock. Stabilising the butt at a desired height permits the user to move the barrel of the rifle horizontally whilst substantially preventing any vertical movement. Existing support devices can include a screw threaded assembly requiring a user to move their hand to adjust a screw thread and thereby adjust the height of the butt above a supporting surface. When the user is supporting part of the weight of the rifle invariably the barrel of the rifle will move due to movement of parts of the user's body in contact with the rifle such as the user's arm, hand, shoulder and cheek.

In general, when a user is shooting a rifle fitted with a bipod from the prone position the user's first movement is to aim the sights of the rifle at the vicinity of the target. With subsequent more precise movements the user will then aim the sights of the rifle directly at the target aiming point. If before firing the rifle is to be maintained in a steady position so that the sights are to be aimed directly at a target aiming point for a lengthy period of time, or if the rifle is to be moved to aim the sights directly at a moving target aiming point, then this can result in considerable physical strain on the part of the user and may result in the user tiring and/or becoming less accurate.

Accordingly, there exists a need for a solution to the problem of maintaining the sights of a rifle aimed directly at a target aiming point whilst the user is in the prone position. There also exists a need for a solution to the problem of maintaining the sights of the rifle aimed at a target aiming point without the need to carry and place a support device beneath the butt of the rifle and without the need to make manual adjustments to the height of the butt above a supporting surface such as by manually rotating a screw thread assembly requiring movement of the user's hand. There also exists a need to provide a means for minimising the time required to reacquire a target aiming point after firing a shot with the rifle.

SUMMARY OF THE INVENTION

Accordingly, in a first aspect, the present invention provides a leg for a firearm, the leg including:
  a pair of telescopically slidable elongated members;
  the first member configured to be fixed to the stock of a rifle;
  the second member being telescopically slidable relative to the first member between a retracted position and an extended position;
  a biasing means to bias the second member towards the extended position; and
  a damper means for damping the movement of the second member between the retracted and extended positions.

The present invention is advantageous when fixed to the butt of the stock of a rifle the leg provides a means of supporting at least part of the weight of the rifle, in particular the weight of the butt and the stock of the rifle, on a surface. The invention is particularly suitable for use with a rifle to which a bipod (not shown) is mounted towards the front of the stock of the rifle. Thus, when a user is using the rifle provided with a bipod and when the user is in a prone position the user can release the locking mechanism to enable the second elongated member, to move from the retracted position towards the extended position to support part of the weight of the rifle. The damping provided by the damper means for the movement of the second elongated member enables the user to effectively control the degree and speed at which the second elongated member is extended from the first elongated member between the retracted and extended positions so as to accurately adjust the elevation of the rifle on a target. The damper means, by preventing rapid movement of the second elongated member relative to the first elongated member, also allows a user to maintain the degree of extension of the second elongated member from the first elongated member and thereby maintain the elevation of the rifle in a stable position for extended periods of time.

Furthermore, the biasing means enables a user, by applying a downwards force on the butt of the rifle, to cause the second elongated member to move in a direction from the extended position towards the retracted position in order to raise the elevation of the rifle. The biasing means also allows the user to release at least some of the pressure applied to the butt in the downwards direction to enable the force of the biasing means, in the form of the compressible gas, within the gas chamber to thereby move the second elongated member in a direction from the retracted position towards the extended position in order to lower the elevation of the rifle on a target.

As can be appreciated, the damping action provided by the invention controls the rate of motion of the second elongated member relative to the first elongated member to thereby provide stable and controlled changes to the elevation of the rifle on a target. Furthermore, the damping action also enables a user to maintain the elevation of the rifle in a steadier position for greater periods of time by reducing the propensity of the biasing means, in the form of the compressible gas to cause oscillations and/or fluctuations in the degree of extension of the second elongated member relative to the first elongated member.

In one form, one of the first member and the second member is a casing having an inner surface defining in part a gas chamber, the other one of the first member and the second member is a piston received at least partially in the casing for reciprocation along an axis between the retracted and extended positions, the biasing means including a compressible gas contained in the chamber that yieldably biases the piston towards the extended position.

In one form, the piston separates the gas chamber into first and second gas chamber portions and the damping means includes a gas passage through which the gas passes between the first and second gas chamber portions.

In one form, the passage is configured to control a rate of flow of the gas between the first and second gas chamber portions.

In one form, the leg further includes a seal between the piston and the inner surface of the casing for substantially preventing the passage of gas between the first and second gas chamber portions other than through the gas passage.

In one form, the gas chamber contains a viscous fluid.

In one form, one of the first member and the second member is a casing having an inner surface defining in part a gas chamber and in part a viscous fluid chamber, the other one of the first member and the second member is a piston received at least partially in the casing for reciprocation along an axis between the retracted and extended positions, the biasing means including a compressible gas contained in the gas chamber that yieldably biases the piston towards the extended position.

In one form, a separator member is received in the casing for reciprocation along an axis between the retracted and extended positions, the separator member separates the gas chamber from the viscous fluid chamber and the piston separates the viscous fluid chamber into first and second viscous fluid chamber portions.

In one form, the damping means includes a viscous fluid in the viscous fluid chamber and a viscous fluid passage through which the viscous fluid passes between the first and second viscous fluid chamber portions.

In one form, the viscous fluid passage is configured to control a rate of flow of the viscous fluid between the first and second viscous fluid chamber portions.

In one form, the leg further includes a seal between the piston and the inner surface of the casing for substantially preventing the passage of viscous fluid between the first and second viscous fluid chamber portions other than through the viscous fluid passage.

In one form, the leg further includes a helical spring to bias the second member from the retracted position towards the extended position.

In one form, the leg further includes a locking mechanism having a locked condition for locking the second member in the retracted position and an unlocked condition for releasing the second member to move from the retracted position towards the extended position.

In one form, the locking mechanism includes a locking tab that is biased by a biasing element towards a locking position in which the tab fits within a groove in the second member to lock the second member from movement relative to the first member when in the retracted position.

In one form, the locking tab is manually operable against a biasing force provided by the biasing element to cause the tab to move out of the groove to enable movement of the second member relative to the first member.

In one form, the leg further includes a mounting configured to be fixed within a stock of a rifle, the first member and the mounting being configured to be releasably secured together.

In one form, the mounting includes an opening for receiving the first member therethrough, the opening and the first member including a bayonet fitting to releasably connect the first member within the opening of the mounting.

In another aspect, the invention provides a rifle stock including an aperture adjacent to the butt of the stock extending from a bottom of the butt towards a top of the butt and including any of the forms of the leg set out above mounted there within.

A reference herein to a patent document or other matter which is given as prior art is not to be taken as an admission that the document or matter was known or that the information it contains was part of the common general knowledge as at the priority date of any of the claims.

BRIEF DESCRIPTION OF THE DRAWINGS

The present invention will now be described with reference to the accompanying figures, which illustrate particular preferred embodiments of the present invention.

DETAILED DESCRIPTION

Figure 1:
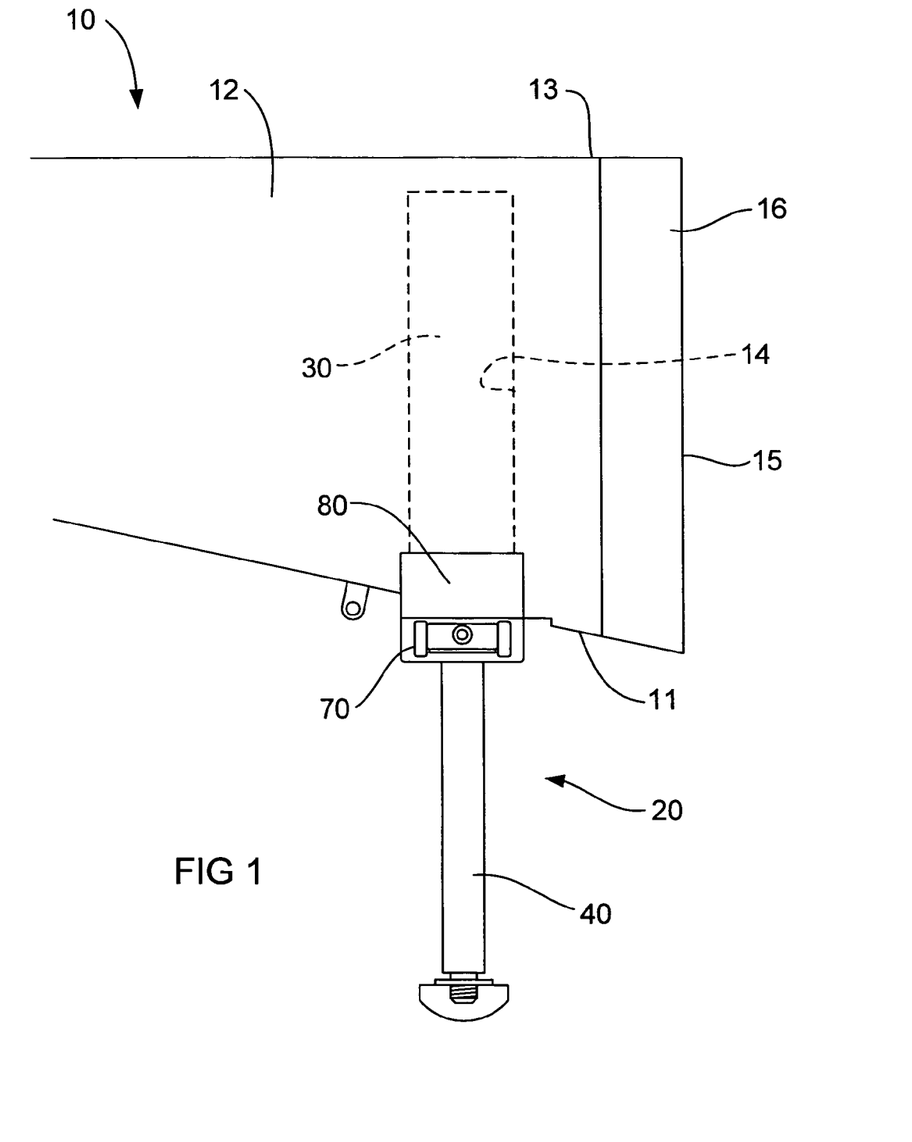
FIG. 1 illustrates a side view of a butt of a rifle including a leg in accordance with an embodiment of the invention, the leg including a first elongated member mounted within the butt and a second elongated member that is telescopically slidable within the first elongated member, wherein the second elongated member is in an extended position.
Figure 2:
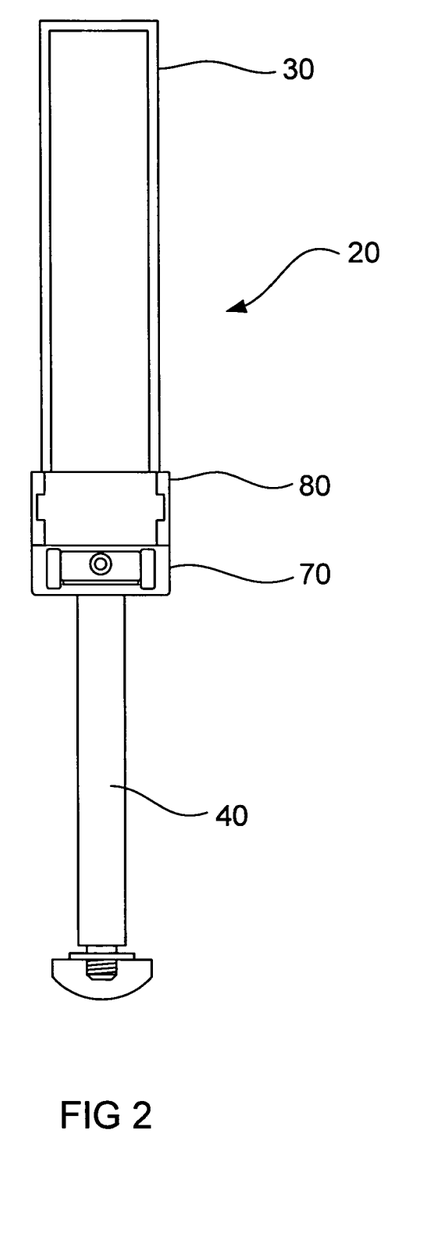
FIG. 2 illustrates a side view of the leg of FIG. 1.
Figure 7:
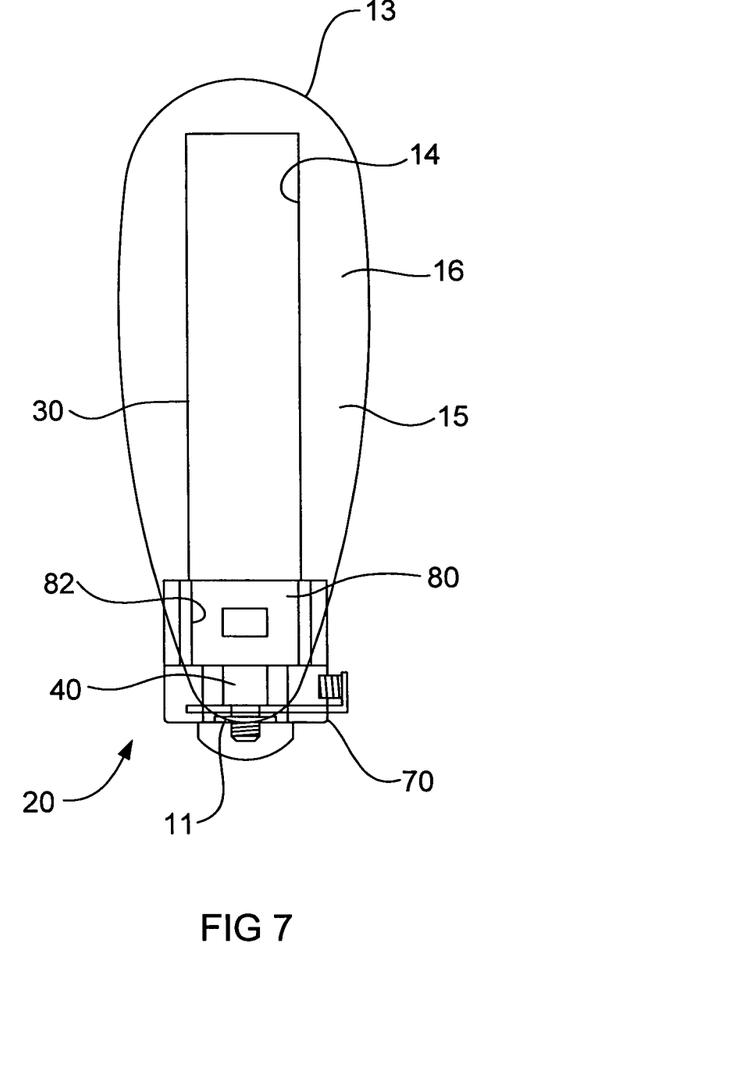
FIG. 7 illustrates an end view of a cross-section of the butt containing the leg of FIG. 1.
Figure 8:
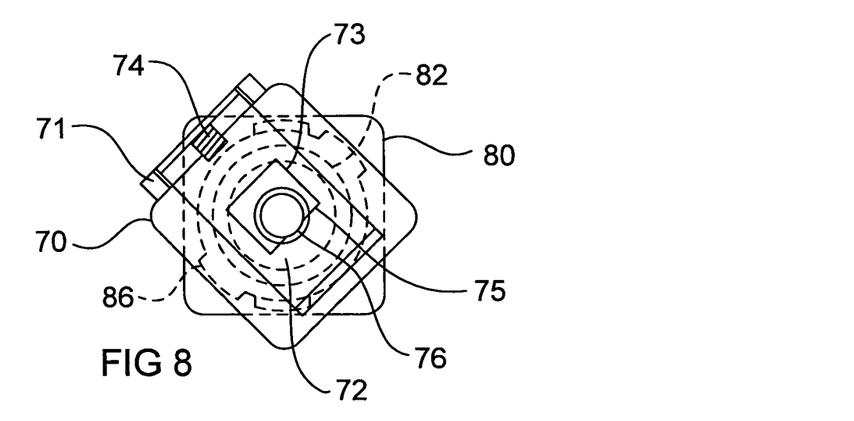
FIG. 8 illustrates a bottom view of the leg of FIG. 1 wherein the leg is connected to a mounting within the butt via a bayonet fitting.
Figure 9:
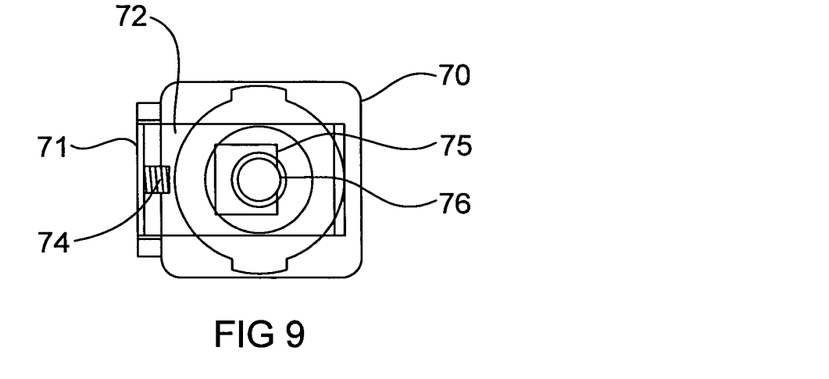
FIG. 9 illustrates a top view of a locking mechanism of the leg of FIG. 1 for locking the second member in a retracted position relative to the first member wherein the locking mechanism is in a locked condition.
Figure 10:
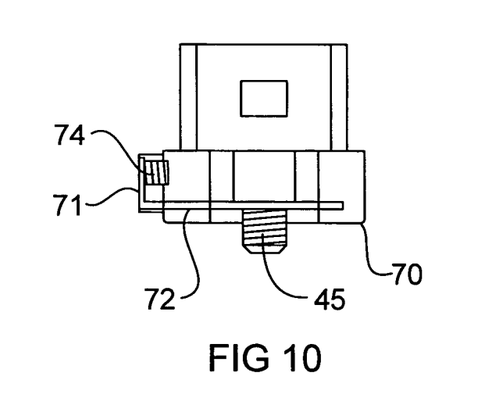
FIG. 10 illustrates a side view of a cross-section of the locking mechanism of the leg of FIG. 1.
Figure 11:
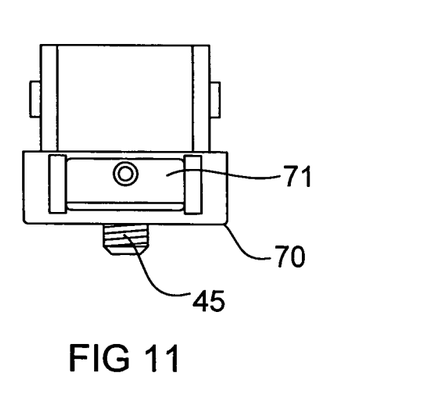
FIG. 11 illustrates a side view of the locking mechanism of the leg of FIG. 1.

Referring to FIG. 1, there is shown a butt 16 portion of a stock 12 of a firearm 10 in the form of a rifle. The butt 16 has a top 13 and a bottom 11 and a back 15 extending substantially vertically between the bottom 11 and the top 13. An aperture 14 extends substantially vertically from the bottom 11 towards the top 13 and is substantially cylindrical in shape. Located within the aperture 14 is a mounting 80 which may be formed out of any suitable material. For example, the mounting 80 may be cast within the aperture 14 of the butt 16 and may be formed out of a metallic material such as aluminium or out of a plastic or any other suitable material. As shown in FIG. 8, the mounting 80 includes a central opening 82 which extends axially through the mounting 80. As shown in FIGS. 1 and 7, the central opening 82 is configured to receive a first elongated member 30 of the leg 20 therethrough. As shown in FIG. 8, the mounting 80 and the first elongated member 30 include a bayonet fitting 86 for releasably connecting the first member 30 within the opening 82 of the mounting 80.

Figure 3:
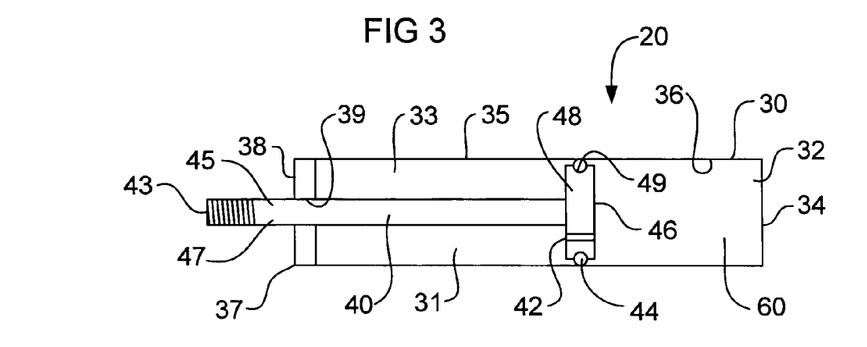
FIG. 3 illustrates a cross-section of the leg of FIG. 1 wherein the first elongated member includes a cylindrical casing and the second elongated member includes a piston including a cylindrical piston member and a rod extending therefrom in an axial direction, wherein the piston is in a substantially retracted position.
Figure 4:
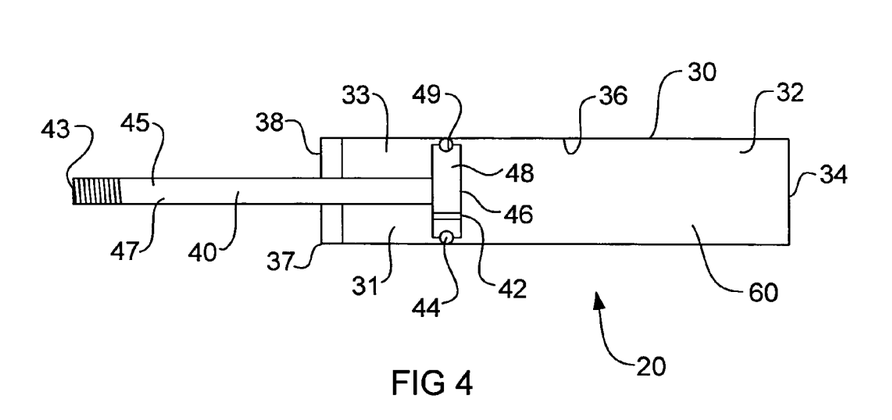
FIG. 4 illustrates a side view of the leg of FIG. 1 wherein the piston is in a substantially extended position.

Referring to FIGS. 3 and 4, there is shown an embodiment of the leg 20 including the first elongated member 30 and a second elongated member 40 that are arranged to be telescopically slidable relative to each other. In particular, the second elongated member 40 is arranged to be telescopically slidable relative to the first member 30 between a retracted position and an extended position. FIG. 3 illustrates the second elongated member 40 in a substantially retracted position and FIG. 4 illustrates the second elongated member 40 in a substantially extended position.

Referring to FIGS. 3 and 4, which illustrates a cross-section of the leg 20, the first elongated member 30 is in the form of a substantially cylindrical shaped casing 35 having a closed top 34 and a cylindrical inner surface 36 extending axially from the closed top 34 to a bottom 37 of the casing 35. Mounted within the bottom 37 of the casing 35 is a annular sleeve 38 that is sealed against the inner surface 36 of the casing 35 and includes a central axially extending opening 39. The inner surface 36 defines, in part, a gas chamber 31. The second elongated member 40 includes a piston 45 which may take any suitable form. In the embodiment illustrated in FIGS. 3 and 4, the piston 45 includes a disc shaped piston member 46 and a rod 47 extending axially from the piston member 46. The rod 47 is received within the opening 39 of the annular sleeve 38 of the first elongated member 30. A gas tight seal is provided between the rod 47 and the annular sleeve 38. The piston member 46 and the rod 47 of the piston 45 are configured to move in a reciprocal motion within the gas chamber 31 along an axis between a retracted position, as shown in FIG. 3, and an extended position, as shown in FIG. 4. The piston member 46 includes an annular notch 49 in a side surface 48 thereof. A seal 44 is positioned within the notch 49. The seal 44 may be an O-ring formed out of rubber or may be in the form of a metallic ring. The piston member 46 divides the gas chamber 31 into a first gas chamber 32 positioned between the piston member 46 and the closed top 34 of the casing 35 and a second gas chamber 33 positioned between the piston member 46 and the bottom 37 and annular sleeve 38 of the casing 35. A compressible gas 60 is provided in the gas chamber 31. The compressible gas 60 may be any suitable form of gas including nitrogen. The gas 60 within the gas chamber 31 is at a predetermined pressure for a purpose which will be outlined below.

In use, the second elongated member 40 is biased from the retracted position and towards the extended position by the pressurised gas 60 contained within the gas chamber 31. In particular, when the piston 45 including the piston member 46 and the rod 47 is moved from the extended position shown in FIG. 4 towards the retracted position shown in FIG. 3 the volume within the gas chamber 31 occupied by the piston 45 increases which thereby compresses the gas 60 contained within the gas chamber 31. The resulting increase in pressure of the gas 60 within the gas chamber 31 applies a force to the piston 45 tending to bias the piston 45 from the retracted position towards the extended position in order to reduce the amount of volume of the gas chamber 31 occupied by the piston 45 to reduce the pressure of the gas 60 contained within the gas chamber 31. Gas is suitable for providing the biasing force to the piston 45 because the gas can be compressed and can yieldably bias the piston 45 towards the extended position. Any other arrangement that yieldably biases the second member 40 towards the extended position may be utilised. Accordingly, at any position of the piston 45 between the retracted and extended positions the piston 45 can be moved with the application of an external force greater than the biasing force provided by the compressed gas towards the retracted position. The gas yields to this external force by undergoing compression yet all the while continues to exert a force against the piston 45 from the retracted position to the extended position.

As shown in FIGS. 3 and 4, the piston member 46 also includes an aperture 42 extending through the piston member 46 between the first gas chamber 32 and the second gas chamber 33 to provide a passage for the gas 60 to pass between the first gas chamber 32 and the second gas chamber 33 as the piston 45 moves in either direction between the extended position and the retracted position thereof. The purpose of the aperture 42 is to control the flow of gas between the first gas chamber 32 and the second gas chamber 33 to thereby provide for damping of the movement of the second elongated member 40, including the piston 45, between the retracted and extended positions relative to the first elongated member 30. By altering the diameter of the aperture 42 and/or by altering the pressure of gas in the gas chamber 31 the amount of damping of the movement of the second elongated member 40 can be controlled. As described herein, the damping action of the damper means is advantageous in use because of the control it imparts upon the movement of the second elongated member 40 relative to the first elongated member 30 when the leg 20 is mounted to the butt 16 of the stock 12 of the rifle 10. The seal 44 between the piston member 46 and the inner surface 36 of the casing 35 substantially prevents the passage of gas 60 between the first gas chamber 32 and the second gas chamber 33 other than via the aperture 42 to ensure that the amount of damping specified by the diameter of the aperture 42 is provided and is not affected by the passage of gas 60 between the first gas chamber 32 and the second gas chamber 33 via any route other than the aperture 42.

Figure 5:
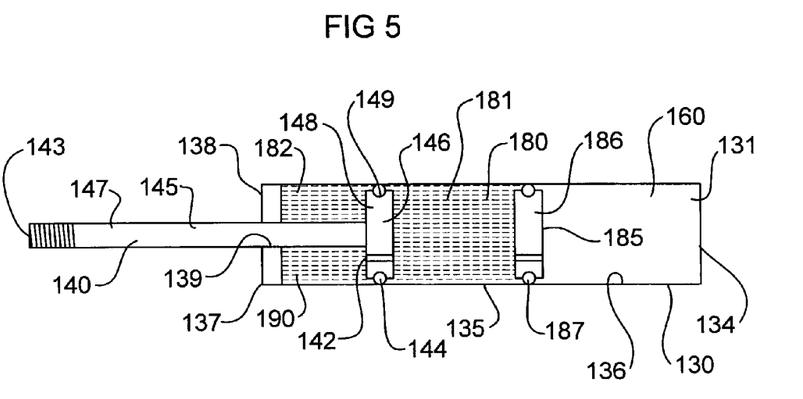
FIG. 5 illustrates a cross-section of another embodiment of the leg of FIG. 1 wherein the first elongated member includes a casing defining in part a gas chamber and in part a viscous fluid chamber wherein the piston includes a piston member and a rod extending axially therefrom, wherein the piston is located within a viscous fluid contained in the viscous fluid chamber, a separator member separates gas contained in a gas chamber from the fluid contained in the fluid chamber, wherein the piston is in a substantially extended position.
Figure 6:
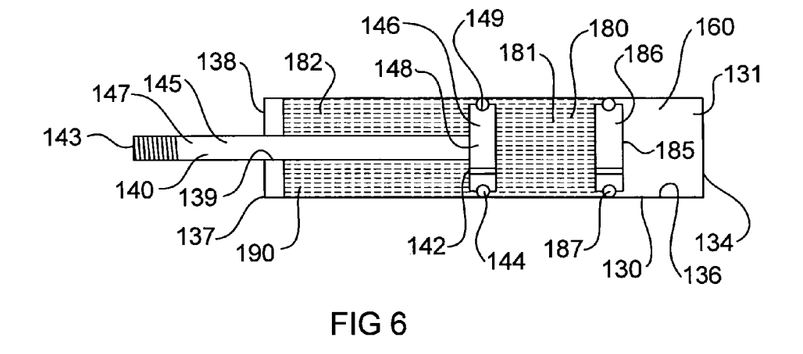
FIG. 6 illustrates a cross section of the leg of FIG. 5 wherein the piston is in a substantially retracted position.

Referring to FIGS. 5 and 6, there is shown another embodiment of the leg 120. In contrast to the previous embodiment illustrated in FIGS. 3 and 4, the embodiment of the leg 120 illustrated in FIGS. 5 and 6 includes a first member 130 having a casing 135 with an inner surface 136 defining in part a gas chamber 131 and in part a viscous fluid chamber 180.

Referring to FIGS. 5 and 6, which illustrates a cross-section of the leg 120, the first elongated member 130 is in the form of a substantially cylindrical shaped casing 135 having a closed top 134 and the cylindrical inner surface 136 extending axially from the closed top 134 to a bottom 137. Mounted within the bottom 137 of the casing 135 is a annular sleeve 138 that is sealed against the inner surface 136 of the casing 135 and includes a central axially extending opening 139. The inner surface 136 defines, in part, the gas chamber 131 and, in part, the fluid chamber 180. The second elongated member 140 includes a piston 145 which may take any suitable form. In the embodiment illustrated in FIGS. 5 and 6, the piston 145 includes a disc shaped piston member 146 and a rod 147 extending axially from the piston member 146. The rod 147 is received within the opening 139 of the annular sleeve 138 of the first elongated member 130. A fluid tight seal is provided between the rod 147 and the annular sleeve 138. The piston member 146 and the rod 147 of the piston 145 are configured to move in a reciprocal motion within the fluid chamber 180 along an axis between a retracted position, as shown in FIG. 5, and an extended position, as shown in FIG. 6. The piston member 146 includes an annular notch 149 in a side surface 148 thereof. A seal 144 is positioned within the notch 149. The seal 144 may be an O-ring formed out of rubber or may be in the form of a metallic ring. The piston member 146 divides the fluid chamber 180 into a first fluid chamber 181 positioned between the piston member 146 and the closed top 134 of the casing 135 and a second fluid chamber 182 positioned between the piston member 146 and the bottom 137 and annular sleeve 138 of the casing 135. A viscous, incompressible fluid 190 is provided in the viscous fluid chamber 180. The fluid 190 may be any suitable form of fluid such as oil.

Contained within the casing 135 is a separator member 185 which is in the form of a substantially circular shaped disc member located between the piston member 146 and the closed top 134. The separator member 185 is adapted to slide in a reciprocating motion within the casing 135 along the axis between the retracted and extended positions of the piston 145. Between the separating member 185 and the closed top 134 is a gas chamber 131 containing a compressible gas 160 at a predetermined pressure. The separator member 185 has a cylindrically shaped side surface 186 having an annular notch 187 for receiving a annular seal 187 which may be in any suitable form including a rubber O ring or a metallic ring. The separator member 185 separates the gas chamber 131 from the fluid chamber 180.

In use, the separating member 185 is biased in a direction from the closed top 134 to the bottom 137 of the casing 135 by the pressurised gas 160 contained within the gas chamber 131. In particular, when the piston 145 including the piston member 146 and the rod 147 is moved from the extended position shown in FIG. 6 towards the retracted position shown in FIG. 5 the volume within the viscous fluid chamber 180 occupied by the piston 145 increases which thereby causes the separator member 185 to move towards the closed end 134 and compress the gas 160 contained within the gas chamber 131. The resulting increase in pressure of the gas 160 within the gas chamber 131 applies a force to the separator member 185 tending to bias the separator member 185 towards the bottom 137 of the casing 135 in order to cause the piston 145 to move from the retracted position to the extended position to reduce the amount of volume of the viscous fluid chamber 180 occupied by the piston 145 to reduce the pressure of the gas 160 contained within the gas chamber 131.

As shown in FIGS. 5 and 6, the piston member 146 also includes an aperture 142 extending through the piston member 146 between the first fluid chamber 181 and the second fluid chamber 182 to provide a passage for the fluid 190 to pass between the first fluid chamber 181 and the second fluid chamber 182 as the piston 145 moves in either direction between the extended position and the retracted position thereof. The purpose of the aperture 142 is to control the flow of fluid 190 between the first fluid chamber 181 and the second fluid chamber 182 to thereby provide for damping of the movement of the second elongated member 140, including the piston 145, between the retracted and extended positions relative to the first elongated member 130. By altering the diameter of the aperture 142 and/or the viscosity of the fluid 190 the amount of damping of the movement of the second elongated member 140 can be controlled. As described herein, the damping action of the damper means is advantageous in use because of the control it imparts upon the movement of the second elongated member 140 relative to the first elongated member 130 when the leg 120 is mounted to the butt 116 of the stock 112 of the rifle 110. The seal 144 between the piston member 146 and the inner surface 136 of the casing 135 substantially prevents the passage of fluid 190 between the first fluid chamber 181 and the second fluid chamber 182 other than via the aperture 142 to ensure that the amount of damping specified by the diameter of the aperture 142 is provided and is not affected by the passage of fluid 190 between the first fluid chamber 181 and the second fluid chamber 182 via any route other than the aperture 142.

The embodiment illustrated in FIGS. 5 and 6 is advantageous in that by providing viscous fluid 190 in the viscous fluid chamber 180 the damping provided by the flow of viscous fluid 190 between the first viscous fluid chamber 181 and the second viscous fluid chamber 182 through the viscous fluid passage 142 is more pronounced than in the embodiment illustrated in FIGS. 3 and 4 wherein the damping is provided by the flow of gas between the first gas chamber 32 and the second gas chamber 33 through the aperture 42.

The present invention is advantageous in that either of the embodiments of the leg 20, 120 when fixed to the butt 16 of the stock 12 of the rifle 10 provides for a means of supporting at least part of the weight of the rifle 10, in particular the weight of the butt 16 and the stock 12 of the rifle 10 on a surface. The invention is particularly suitable for use with a rifle 10 to which a bipod (not shown) is mounted towards the front of the stock 12 of the rifle 10. Thus, when a user is using the rifle 10 provided with a bipod and when the user is in a prone position the user can release the locking mechanism 70 to enable the second elongated member 40, 140 to move from the retracted position towards the extended position to support part of the weight of the rifle and because of the damping provided by the above described damping means for the movement of the second elongated member 40, 140 the user can effectively control the degree to which the second elongated member 40, 140 is extended from the first elongated member 30, 130 between the retracted and extended positions so as to adjust the elevation of the rifle 10 on a target. The damping means also allows a user to maintain the degree of extension of the second elongated member 40, 140 from the first elongated member 30, 130 and thereby maintain the elevation of the rifle 10 in a stable position for extended periods of time.

Furthermore, the biasing means enables a user, by applying a downwards force on the butt 16 of the rifle 10, to cause the second elongated member 40, 140 to move in a direction from the extended position towards the retracted position in order to raise the elevation of the rifle 10. The biasing means also allows the user to release at least some of the pressure applied to the butt 16 in the downwards direction to enable the force of the biasing means, in the form of the compressible gas 60, 160 within the gas chamber 31, 131 to thereby move the second elongated member 40, 140 in a direction from the retracted position towards the extended position in order to lower the elevation of the rifle 10 on a target.

As can be appreciated, the damping action provided by the embodiments set out above controls the rate of motion of the second elongated member 40 relative to the first elongated member 30 to thereby provide stable and controlled changes to the elevation of the rifle 10 on a target. Furthermore, the damping action also enables a user to maintain the elevation of the rifle 10 in a steadier position for greater periods of time by reducing the propensity of the biasing means, in the form of the compressible gas 31, 131, to cause oscillations and/or fluctuations in the degree of extension of the second elongated member 40, 140 relative to the first elongated member 30, 130.

As shown in FIGS. 8, 9, 10, and 11, the embodiments of the leg 20, 120 also include a locking mechanism 70 that is operable for locking the second member 40, 140 from movement relative to the first member 30, 130 when in the retracted position. The locking mechanism 70 includes a transversely slidable locking tab 72 that is mounted to the first elongated member 30 immediately adjacent to the bottom 37 thereof. The tab 72 is a substantially square shaped member and includes a central aperture 73 that moves along with the tab 72 in opposite directions substantially transverse to the axis between the retracted and extended positions of the second elongated member 40. The second elongated member 40 includes a groove 76 or notch in a side surface of the rod 47, 147 of the piston 45, 145. The groove 76 is located immediately adjacent to a distal end 43, 143 of the rod 47, 147 opposite to the end of the rod 47, 147 connected to the piston member 46, 146. Accordingly, when the piston 45, 145 is in the retracted position within the casing 35, 135 the groove 76 towards the distal end 43, 143 of the rod 47, 147 meets the aperture 73 of the locking mechanism 70. The locking tab 72 includes a biasing element 74 in the form of a helical spring which biases the locking tab 72 in a transverse direction relative to the rod 47, 147 to cause an edge 75 of the aperture 73 to engage the groove 76 within the rod 47, 147. The locking mechanism 70 also includes a manual release button 71 which is operable to cause the locking tab 72 to move in a direction transverse to the rod 47, 147 against the biasing force provided by the biasing element 74 such that the edge 75 of the aperture 73 moves out of engagement with the groove 76 of the rode 47, 147 to enable the second elongated member 40, 140 to move relative to the first member 30, 130 from the retracted position towards the extended position as detailed above. Accordingly, the locking mechanism 70 provides a convenient and effective means for maintaining the second elongated member 40, 140 in a stowed position when not in use. Furthermore, the locking mechanism 70 provides a convenient and effective means for releasing the second elongated member 40, 140 from the stowed position when use of the leg 20, 120 of the invention is required.

Those skilled in the art will appreciate that the invention described herein is susceptible to variations and modifications other than those specifically described. It is to be understood that the invention includes all such variations and modifications which fall within the spirit and scope of the present invention.

Future patent applications may be filed in Australia or overseas on the basis of or claiming priority from the present application. It is to be understood that the following provisional claims are provided by way of example only and are not intended to limit the scope of what may be claimed in such future application. Features may be added to or omitted from the provisional claims at a later date so as to further define or redefine the invention or inventions.

The invention claimed is:

1. A rifle leg, the leg including:
a pair of telescopically slidable elongated members;
the first member configured to be fixed to the stock of a rifle;
the second member being telescopically slidable relative to the first member between a retracted position and an extended position,
the second member being biased towards the extended position by a biasing force;
wherein the movement of the second member between the refracted and extended positions is damped to assist in controlling the relative movement of the first and second members; and
wherein the biasing force applied to the second member to bias the second member towards the extended position is operable to at least partially support the rifle at any relative position of the first and second members between the retracted and extended positions.

2. The rifle leg of claim 1, wherein the second member is adapted to rest on a supporting surface and the relative position of the first and second members between the refracted and extended positions is adjustable to adjust the rifle to a desired elevation.

3. The rifle leg of claim 1, wherein one of the first member and the second member is a casing having an inner surface defining in part a gas chamber, the other one of the first member and the second member is a piston received at least partially in the casing for reciprocation along an axis between the refracted and extended positions, the biasing force applied to the second member being provided by a compressible gas contained in the chamber that yieldably biases the piston towards the extended position.

4. The rifle leg of claim 3, wherein the piston separates the gas chamber into first and second gas chamber portions and wherein the damping movement of the second member between the refracted and extended positions is provided by a gas passage through which the gas passes between the first and second gas chamber portions.

5. The rifle leg of claim 4, wherein the passage is configured to control a rate of flow of the gas between the first and second gas chamber portions.

6. The rifle leg of claim 4, further including a seal between the piston and the inner surface of the casing for substantially preventing the passage of gas between the first and second gas chamber portions other than through the gas passage.

7. The rifle leg of claim 3, wherein the gas chamber contains a viscous fluid.

8. The rifle leg of claim 1, wherein one of the first member and the second member is a casing having an inner surface defining in part a gas chamber and in part a viscous fluid chamber, the other one of the first member and the second member is a piston received at least partially in the casing for reciprocation along an axis between the retracted and extended positions, the biasing force applied to the second member being provided by a compressible gas contained in the gas chamber that yieldably biases the piston towards the extended position.

9. The rifle leg of claim 8, wherein a separator member is received in the casing for reciprocation along an axis between the retracted and extended positions, the separator member separates the gas chamber from the viscous fluid chamber and the piston separates the viscous fluid chamber into first and second viscous fluid chamber portions.

10. The rifle leg of claim 9, wherein the damping of movement of the second member between the retracted and extended positions is provided by a viscous fluid in the viscous fluid chamber and a viscous fluid passage through which the viscous fluid passes between the first and second viscous fluid chamber portions.

11. The rifle leg of claim 10, wherein the viscous fluid passage is configured to control a rate of flow of the viscous fluid between the first and second viscous fluid chamber portions.

12. The rifle leg of claims 9, further including a seal between the piston and the inner surface of the casing for substantially preventing the passage of viscous fluid between the first and second viscous fluid chamber portions other than through the viscous fluid passage.

13. The rifle leg of claims 1, further including a helical spring to for biasing the second member from the retracted position towards the extended position.

14. The rifle leg of claims 1, further including a locking mechanism having a locked condition for locking the second member in the retracted position and an unlocked condition for releasing the second member to move from the retracted position towards the extended position.

15. The rifle leg of claim 14, wherein the locking mechanism includes a locking tab that is biased by a biasing element towards a locking position in which the tab fits within a groove in the second member to lock the second member from movement relative to the first member when in the retracted position.

16. The rifle leg of claim 15, wherein the locking tab is manually operable against a biasing force provided by the biasing element to cause the tab to move out of the groove to enable movement of the second member relative to the first member.

17. The rifle leg of claim 1, further including a mounting configured to be fixed within a stock of a rifle, the first member and the mounting being configured to be releasably secured together.

18. The rifle leg of claim 17, wherein the mounting includes an opening for receiving the first member therethrough, the opening and the first member including a bayonet fitting to releasably connect the first member within the opening of the mounting.

19. A rifle stock including an aperture adjacent to the butt of the stock extending from a bottom of the butt towards a top of the butt and including a rifle leg mounted there within, the rifle leg including:
- a pair of telescopically slidable elongated members;
- the first member being fixed to the stock;
- the second member being telescopically slidable relative to the first member between a retracted position and an extended position,
- the second member being biased towards the extended position by a biasing force;
- wherein the movement of the second member between the refracted and extended positions is damped to assist in controlling the relative movement of the first and second members; and
- wherein the biasing force applied to the second member to bias the second member towards the extended position is operable to at least partially support the rifle at any relative position of the first and second members between the retracted and extended positions.

\* \* \* \* \*